March 19, 1929.　　　J. G. HECKEL　　　1,706,117
DENTAL X-RAY FILM HOLDER
Filed April 21, 1928
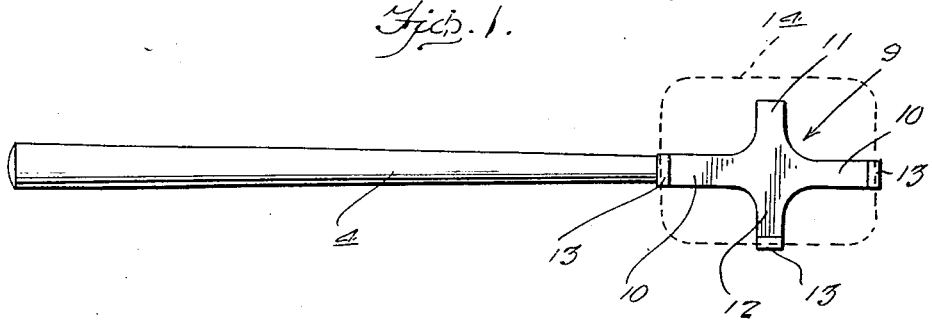
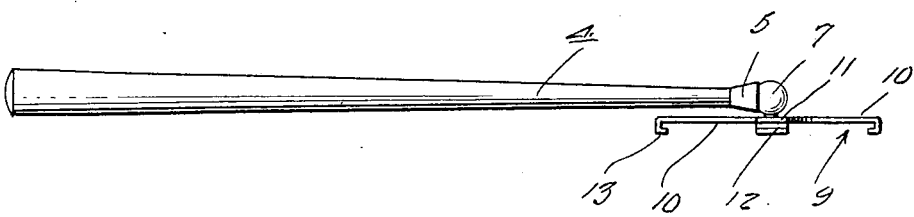
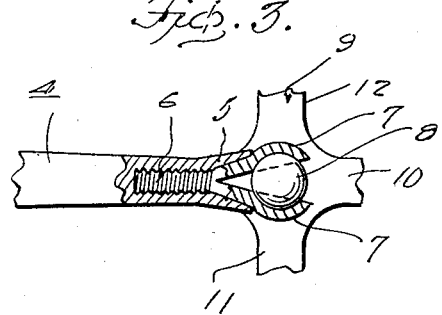
Inventor
J. G. Heckel
By Clarence A. O'Brien
Attorney Patented Mar. 19, 1929.

1,706,117

UNITED STATES PATENT OFFICE.

JACOB G. HECKEL, OF BRADFORD, PENNSYLVANIA.

DENTAL X-RAY-FILM HOLDER.

Application filed April 21, 1928. Serial No. 271,892.

The present invention relates to an improved dental appliance, having more particular reference to an especially designed device, made for holding a small film such as is employed in the making of an X-ray picture of mouth conditions.

The object of the invention is to permit X-ray work to be carried into effect in a more expeditious and desirable manner, by providing an appliance which will conveniently hold the film in proper position and thereby eliminate the common practice of holding the film in place by placing the fingers in the mouth.

It follows that the appliance, is constructed to better fulfill the requirements of work of this class, the same being characterized by simplicity, inexpensiveness, practicability, and sanitation.

The particular structural details, and their relative arrangement and association will become more readily apparent from the following description and drawings.

In the drawings:—

Figure 1 is a bottom plan view of an appliance constructed in accordance with the present invention.

Fig. 2 is a side elevational view of the same.

Fig. 3 is a view in fragmentary section and elevation detailing the ball and socket joint which is one of the prominent features of the invention.

In carrying out the invention, I provide a suitably shaped handle for having an internally screw threaded socket at the small end, together with an integral outwardly flared ferrule. Threaded into the socket, is a screw threaded stem 6 of a coupling member. This coupling member embodies split jaws 7 characterized by opposed semi-spherical portions.

These portions cooperate with a ball joint 8, carried by a cruciform film holding frame 9. This frame as better shown in Figs. 1 and 2, embodies a pair of longitudinally disposed radial arms 10 and relatively short right angularly disposed arms 11 and 12. The arms 10 and 12 are provided with hooks 13 for engaging the edges of the X-ray film 14. The arm 11 has no hook, and thereby serves to permit ready insertion and removal of the film.

From the foregoing, it will be seen that I have evolved and produced the novel and handy dental appliance, embodying a suitably-shaped handle, an appropriately constructed film holding frame, and a universal or ball and socket connection between the frame, and handle.

This arrangement permits the film to be properly angled and placed inside of the mouth, for taking a dependable X-ray picture.

It will be noticed that the parts are separably connected, so that they may be more conveniently sterilized for sanitary purposes.

A more detailed description is regarded unnecessary, for a careful reading of the preceding description and association with the drawings, will permit a clear understanding of the construction, use, and advantages of the invention to be had.

Minor changes in shape, size, re-arrangement, and materials, coming within the field of invention claimed, may be resorted to if desired.

Having thus described my invention, what I claim as new is:—

A dental X-ray film holder of the class described, comprising a handle having a screw threaded socket at one end, a shank threaded into said socket, and provided with a projecting end portion having spaced opposed semi-spherical portions forming a ball socket, a film frame and a ball joint carried thereby, and receivable between the semi-spherical portions before named, said frame comprising a cruciform member having hooked arms.

In testimony whereof I affix my signature.

JACOB G. HECKEL.